United States Patent [19]

Omura et al.

[11] Patent Number: 4,969,661
[45] Date of Patent: Nov. 13, 1990

[54] VEHICULAR REAR SUSPENSION SYSTEM AND REAR END CONSTRUCTION INCLUDING SAME

[75] Inventors: Atsushi Omura, Yokohama; Masatoshi Kikkawa, Fujisawa, both of Japan

[73] Assignee: Nissan Motor Co., Ltd., Yokohama, Japan

[21] Appl. No.: 235,624

[22] Filed: Aug. 24, 1988

[30] Foreign Application Priority Data

Aug. 24, 1987 [JP] Japan ............... 62-209554
Aug. 24, 1987 [JP] Japan ............... 62-209553

[51] Int. Cl.⁵ .................................... B60G 3/00
[52] U.S. Cl. .................................... 280/690
[58] Field of Search ............ 280/688, 690, 700, 701

[56] References Cited

U.S. PATENT DOCUMENTS 4,545,602 10/1985 Shibahata ............... 280/701

FOREIGN PATENT DOCUMENTS

| | | |
|---|---|---|
| 58-101807 | 6/1983 | Japan . |
| 58-188308 | 12/1983 | Japan . |
| 59-130712 | 7/1984 | Japan . |
| 0064009 | 4/1985 | Japan ............... 280/701 |
| 60-116513 | 6/1985 | Japan . |
| 61-42304 | 3/1986 | Japan . |

Primary Examiner—Charles A. Marmor
Assistant Examiner—Richard Camby
Attorney, Agent, or Firm—Foley & Lardner, Schwartz, Jeffery, Schwaab, Mack, Blumenthal & Evans

[57] ABSTRACT

A rear suspension system includes an axle carrier rotatably carrying the road wheel. The axle carrier is connected to the vehicle body via a front lateral link, a rear lateral link, a radius rod and a vertical strut. The front lateral link is shorter than the rear lateral link and has an outboard end pivotably mounted via an elastic bush on the axle carrier at a front pivot portion thereof. The outboard end of the front lateral link is disposed inboard of an outboard end of the rear lateral link. With this arrangement, a toe angle of the outer rear wheel is varied to a toe-in side when the vehicle makes a turn. Thus, the vehicle exhibits a compliance understeer characteristic while making a turn.

12 Claims, 9 Drawing Sheets

DIRECTION OF TRAVEL

DIRECTION OF TRAVEL

DIRECTION OF TRAVEL

DIRECTION OF TRAVEL →

← DIRECTION OF TRAVEL

DIRECTION OF TRAVEL

VEHICULAR REAR SUSPENSION SYSTEM AND REAR END CONSTRUCTION INCLUDING SAME

BACKGROUND OF THE INVENTION

The present invention relates to a rear suspension system for a vehicle, and more particularly to a dual link strut type rear suspension system.

JP-UM 58-188308 discloses a rear suspension system for a vehicle. This known rear suspension system comprises an axle carrier rotatably carrying a rear road wheel, a front lateral link, a rear lateral link, a radius rod and a strut. The front and rear lateral links have inboard ends, each pivotably mounted via an elastic bush to the vehicle body. Outboard end of the front lateral link is pivotably mounted via an elastic bush on the axle carrier at a front pivot portion, while outboard end of the rear lateral link is pivotably mounted via an elastic bush on the axle carrier at a rear pivot portion. The radius rod has a front end pivotably mounted via an elastic bush on the vehicle body and a rear end pivotably mounted via an elastic bush on the axle carrier at a third pivot portion. The arrangement is such that the front and rear lateral links are of the same length and the front pivot portion is disposed outboard of the rear pivot portion. With this arrangement, a toe angle of the rear road wheel is varied toward a toe-in side when the vehicle bumps along the road. When the vehicle bumps along the road, the road wheel is displaced upward. Since the front and rear lateral links are of the same length and the front pivot portion is disposed outboard of the rear pivot portion, the front pivot portion is upwardly displaced about the inboard bush of the front lateral link further than the rear pivot portion is displaced about the inboard bush of the rear lateral link, thereby varying the toe angle of the road wheel toward a toe-in side. The front lateral link extends over the radius rod and thus the front pivot portion is disposed at a level higher than the rear pivot portion to provide a clearance between the front lateral link and the radius rod.

With this known rear suspension system, the toe angle of the road wheel is varied toward a toe-out side when the road wheel is subject to a transverse force directed inboard of the vehicle, since the front pivot portion is disposed outboard of the rear pivot portion. On the contrary, when the road wheel is subject to a transverse force directed outboard of the vehicle, the toe angle of the road wheel is varied toward a toe-in side. This compliance steer due to transverse force causes a steering characterstic of the vehicle to shift toward an oversteer side since a toe angle of the outer rear wheel is varied toward a toe-out side, while a toe angle of the inner rear wheel is varied toward a toe-in side when the vehicle is making a turn. This reduces stability of the vehicle upon making a turn.

Another problem is that restriction is imposed on vertical layout of a radius rod, since the radius rod extends under a front lateral link.

JP 59-130712 A discloses a rear suspension system which has solved the first one of the above-mentioned problems. This known rear suspension system comprises an axle carrier rotatably carrying a rear road wheel, a front lateral link and a rear lateral link, a radius rod and a strut. Inboard ends of the front and rear lateral links are pivotably mounted via an elastic bush on the vehicle body, while outboard ends of them are pivotably mounted via an elastic bush on the axle carrier at a front pivot portion and a rear pivot portion, respectively. A rear end of the radius rod is pivotably mounted via an elastic bush on the axle carrier at a third pivot portion and a front end thereof pivotably mounted on the vehicle body. The strut extends vertically from the axle carrier and has an upper end mounted via an insulator on the vehicle body. As viewed in the vehicle longitudinal direction, the front lateral link is disposed at a level lower than the rear lateral link is. When a transverse force directed inboard of the vehicle is applied to a lower end portion of the rear road wheel, different reaction forces are induced at the front pivot portion and the rear pivot portion. The reaction force induced at the front pivot portion becomes greater than the reaction force induced at the rear pivot portion, since the axle carrier is considered to pivot toward the inboard of the vehicle about the mounting insulator via which the strut is mounted on the vehicle body. Under this condition, the inboard and outboard elastic bushes of the front lateral link are compressed more than the elastic bushes of the rear lateral link are. This results in varying a toe angle of the outer rear wheel toward a toe-in side and a toe angle of the inner rear road wheel toward a toe-out side when the vehicle makes a turn. In this known rear suspension system, the front lateral link extends under the radius rod.

According to this known rear suspension system, the increased rigidity of the front lateral link is required to withstand a greater transverse input force, causing an increase in weight and manufacturing cost. Another problem encountered with this known rear suspension system is that the radius rod can not be inclined vertically because there is no clearance between the front lateral link and the radius rod.

Usually, inboard ends of front and rear lateral links are pivotably mounted via an elastic bush on a suspension member and a front end of a radius rod is pivotably mounted via an elastic bush on the suspension member as clearly shown in FIG. 3 of JP 60-116513 A. According to this known construction, the suspension member has a front mount portion mounted via an insulator on the vehicle body and a rear mount portion mounted via an insulator on the vehicle body. The front mount portion is disposed forward of where the front end of the radius rod is mounted on and the rear mount portion is disposed rearward of the lateral link. This arrangement makes it difficult to provide a space, between the suspension member and a spare tire pan, which a fuel filler hose can extend through.

SUMMARY OF THE INVENTION

According to the present invention, there is provided a vehicular rear suspension system which provides a compliance understeer characteristic to the vehicle when the vehicle makes a turn.

According to the main aspect of the present invention, an axle carrier rotatably carrying a road wheel is connected to a vehicle body via lateral link means. The lateral link means are pivotably supported by the vehicle body and include outboard end portions pivotably mounted on the axle carrier at a front pivot portion thereof and a rear pivot portion thereof, respectively. The front pivot portion is disposed inboard of the rear pivot portion so that when the road wheel is subject to a transverse force directed inboard of the vehicle during the vehicle making a turn, a toe angle of the road wheel is varied toward a toe-in side owing to this arrangement of the front pivot portion relative to the rear pivot portion.

DETAILED DESCRIPTION OF THE INVENTION

Figure 1:
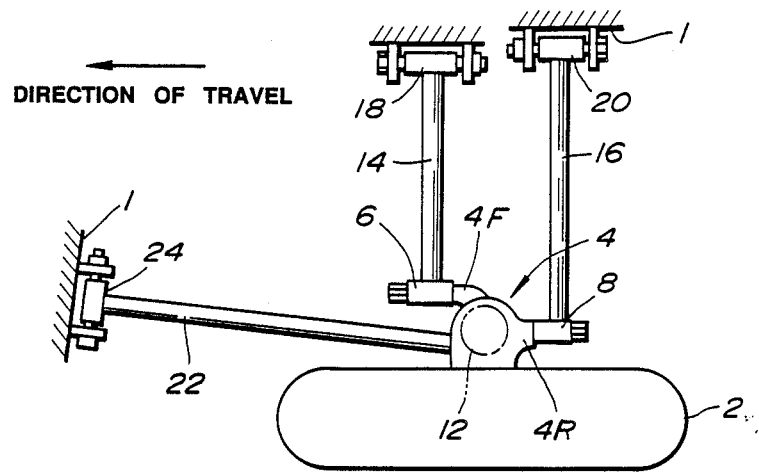
FIG. 1 is a schematic plan view of a first embodiment of a rear suepension system according to the present invention as applied to a rear left wheel of a vehicle.
Figure 2:
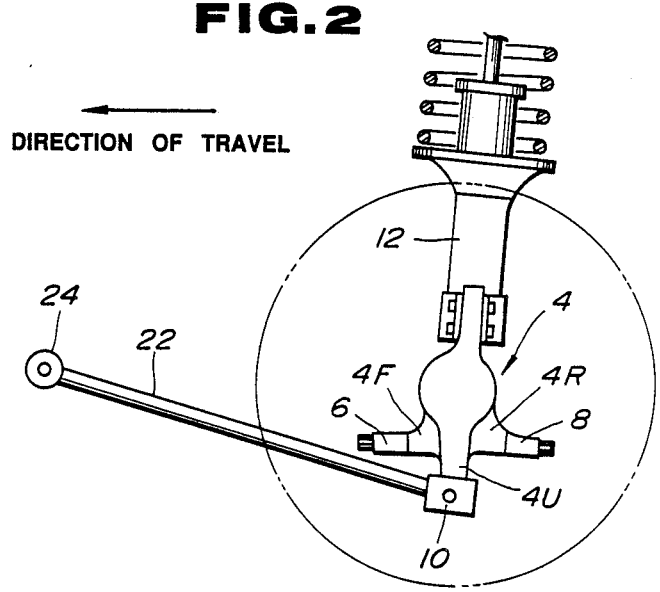
FIG. 2 is a schematic elevational side view of the rear suspension system shown in FIG. 1 with the rear left wheel removed.

Referring to FIGS. 1 and 2, a rear suspension for a rear left wheel 2 of an automotive vehicle is shown. The rear left wheel 2 is rotatably carried by an axle carrier 4 which is connected to the vehicle body 1 via two lateral links 14 and 16, a radius rod 22 and a strut 12. The strut 12 is of a conventional shock absorbing type and extends in a direction which is generally vertical with respect to the vehicle. The strut 12 has a lower end connected to the axle carrier 4 and an upper end mounted via an insulator on a portion of the vehicle body 1. With the strut 12, a force transmitted vertically to the vehicle body 1 from the wheel 2 is absorbed/damped.

Referring particularly to FIG. 1, the lateral link 14 is disposed forward of the other lateral link 16. Hereinafter, the lateral link 14 is called a "front" lateral link and the other lateral link 16 is called a "rear" lateral link. The front lateral link 14 has an inboard end 18 pivotably mounted via an elastic bush on the vehicle body 1, and the rear lateral link 16 has an inboard end 20 pivotably mounted via an elastic bush on the vehicle body 1. An outboard end of the front lateral link 14 is pivotably mounted via an elastic bush on the axle carrier 4 at a front pivot portion 4F thereof, and an outboard end 8 of the rear lateral link 16 is pivotably mounted via an elastic bush on the axle carrier 4 at a rear pivot portion 4R thereof.

As viewed in FIGS. 1 and 2, the radius rod 22 extends in a direction which is generally longitudinal with respect to the vehicle and it has a rear end 10 pivotably mounted via an elastic bush on the axle carrier 4 at a third pivot portion 4U thereof and a front end 24 pivotably mounted via an elastic bush on the vehicle body 1. With the radius rod 22, a force transmitted to the vehicle body 1 longitudinally from the wheel 2 is absorbed.

The inboard ends 18 and 20 of the front and rear lateral links 14 and 16 are pivotable about pivot axes which lie in parallel to the vehicle longitudinal axis. The outboard ends 6 and 8 of them are pivotable about pivot axes which lie in parallel to the vehicle longitudinal axis. In order to vary a toe angle of the wheel 2 to a toe-in side when the wheel is subject to a transverse force directed inboard of the vehicle, the front pivot portion 6 of the axle carrier 4 is disposed inboard of the rear pivot portion 8 thereof as best seen in FIG. 1.

The front end 24 of the radius rod 22 is pivotable about a pivot axis which lies generally in parallel to the vehicle lateral axis, and the rear end 10 of the radius rod 22 is pivotable about an axis which lies generally in parallel to the vehicle lateral axis. As viewed in FIG. 2, the radius rod 22 extends from the third pivot portion 4U in a direction which is angled upward with respect to the vehicle passing through an area outboard of the outboard end 6 of the front lateral link 14. Since the outboard end 6 of the front lateral link 14 is disposed inboard of the radius rod 22, an upward inclined angle of the radius rod 22 can be increased to a desired value, thus providing an improved anti-lift performance of rear wheels when the vehicle is subject to braking.

As best seen in FIG. 2, the outboard ends 6 and 8 of the front and rear lateral links 14 and 16 are disposed in substantially the same horizontal plane with respect to the vehicle. As seen in FIG. 1, the front and rear lateral links 14 and 16 are in parallel and the front lateral link 14 is shorter than the rear lateral link 16. Since the length of the front lateral link 14 is shorter than the length of the rear lateral link 16, the front lateral link 14 of the same structure as the rear lateral link 16 can withstand a relatively larger force transmitted thereto from the wheel 2.

Figure 3:
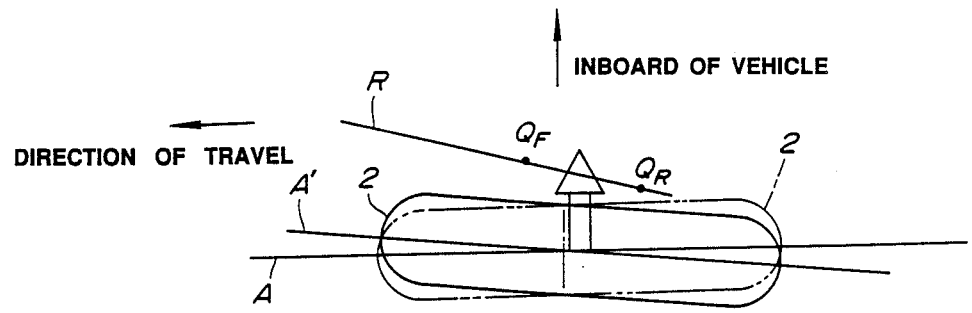
FIG. 3 is a plan diagram illustrating a compliance steer of the first embodiment when the rear left wheel is subject to a transverse force directed inborad of the vehicle.
Figure 4:
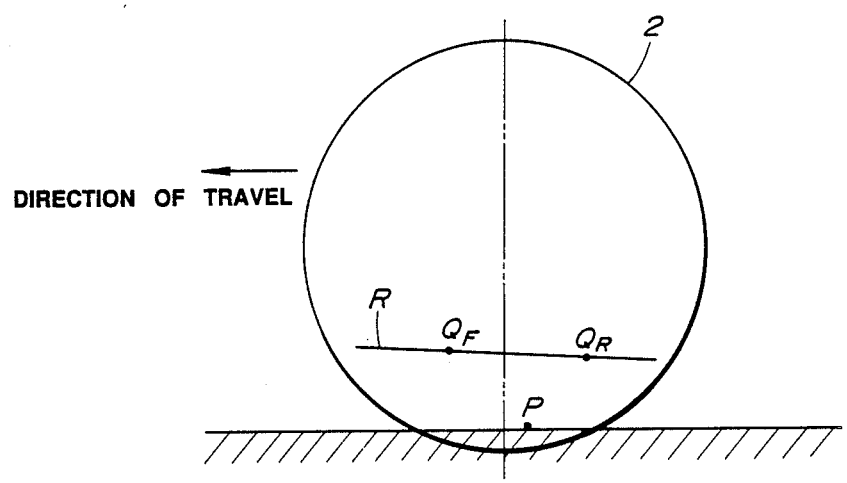
FIG. 4 is an elevational side diagram illustrating the compliance steer.

Referring to FIGS. 3 and 4, it is now explained why and how a toe angle of the rear left wheel 2 is varied to a toe-in side when the vehicle makes a turn to the right.

In FIG. 3, reference characters $Q_F$ and $Q_R$ represent points where the outboard end 6 of the front lateral link 14 and the outboard end 8 of the rear lateral link 16 are pivotably mounted on the front and rear pivot portions 4F and 4R of the axle carrier 4, respectively. Reference character R indicates an axis interconnecting the points $Q_F$ and $Q_R$. The axle carrier 4 is inclined and supported by the front and lateral links 14 and 16 about this axis R when the wheel 2 is subject to a transverse force directed inboard of the vehicle. As viewed in FIG. 3, this axis R is inclined from a tire center line A toward an inboard side of the vehicle.

On straight ahead driving, the rear wheel 2 rotates along the tire center A and thus a toe angle of the wheel 2 is substantially zero.

Let us now consider the case where the vehicle makes a turn to the right. In this case, a transverse force as represented by an arrow in FIG. 3 is applied to the wheel 2 at a point P (see FIG. 4), causing the wheel 2 to be supported about the axis R. Thus, a toe angle of the wheel 2 is varied to a toe-in side as shown by a new tire center line A' in FIG. 3. This results in increased stability of the vehicle when making a turn since the vehicle exibits understeer characteristic.

Figure 5:
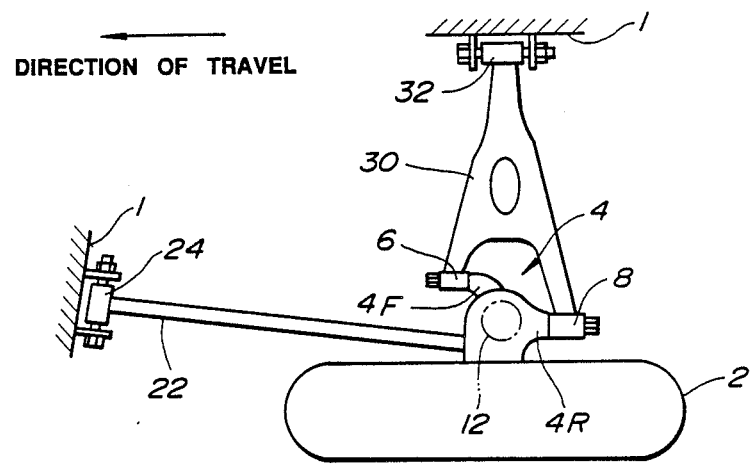
FIG. 5 is a schematic plan view of a second embodiment of a rear suspension system according to the present invention as applied to a rear left wheel of a vehicle.

Although in the previously described embodiment two lateral links 14 and 16 different in length are employed, a single lateral link may be employed instead of such two lateral links as shown in FIG. 5.

Referring to FIG. 5, the single lateral link is designated by a reference numeral 30. The single lateral link 30 has an inboard end 32 pivotably mounted via an elastic bush on a vehicle body 1. It also has a relatively short front arm with an outboard end 6 pivotably mounted via an elastic bush on an axle carrier 4 at a front pivot portion 4F thereof and a relatively long rear arm with an outboard end 8 pivotably mounted via an elastic bush on the axle carrier 4 at a rear pivot portion 4R thereof.

Referring to FIGS. 6 to 9, the third embodiment according to the present invention is described. In this third embodiment, a front lateral link 14 is disposed at a level higher than a rear lateral link 16 as different from the first embodiment.

With this arrangement of the front lateral link 14 according to this third embodiment, a ratio of a component force applied to the front lateral link 14 to a componet force applied to the rear lateral link 16 when a rear wheel 2 is subject to a transverse force directed inboard of the vehicle during cornering of the vehicle decreases.

Figure 7:
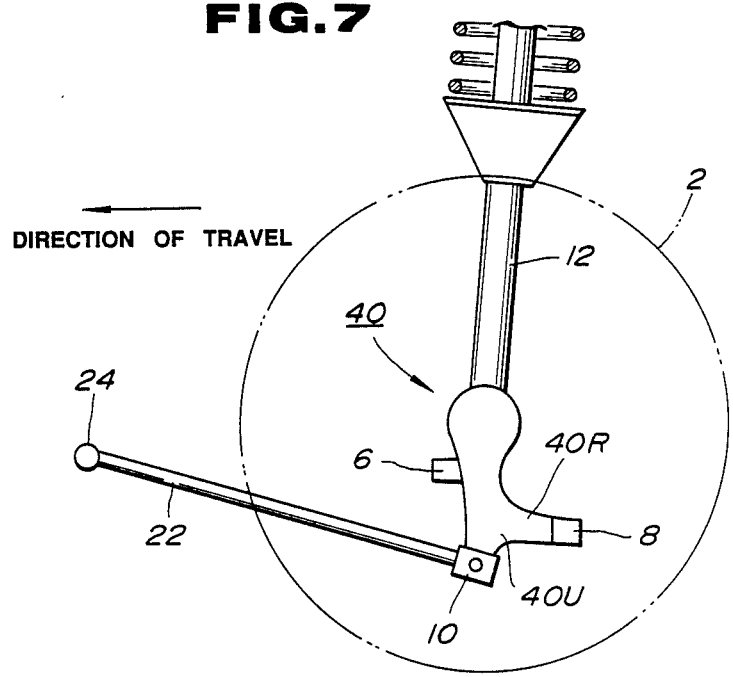
FIG. 7 is a schematic elevational side view of the rear suspension system shown in FIG. 6 with the rear left wheel removed.

As best seen in FIG. 7, an axle carrier 40 which is different from the axle carrier 4 is used in the third embodiment in order to hold the front lateral link 14 at the level higher than the rear lateral link 16. The axle carrier 40 is integrally formed with a front pivot portion 40F, a rear pivot portion 40R and a third pivot portion 40U. The front pivot portion 40F is disposed at a level higher than the rear pivot portion 40R is so that the position of an outboard end 6 of the front lateral link 14 is higher than the position of an outboard end 8 of the rear lateral link 16.

Figure 8:
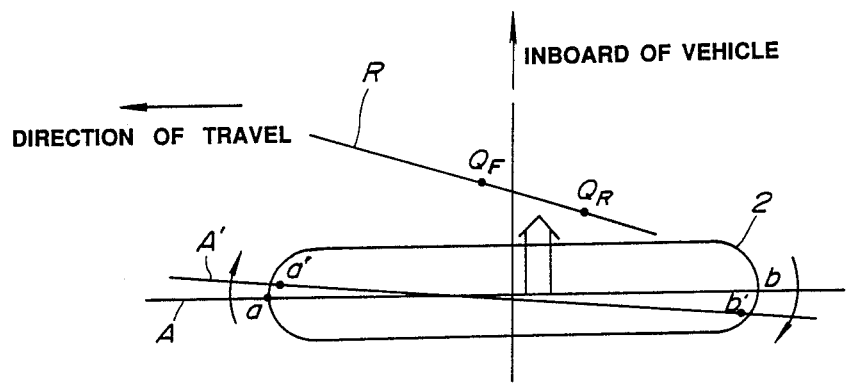
FIG. 8 is a plan diagram illustrating a compliance steer of the third embodiment when the rear left wheel is subject to a transverse force directed inborad of the vehicle.
Figure 9:
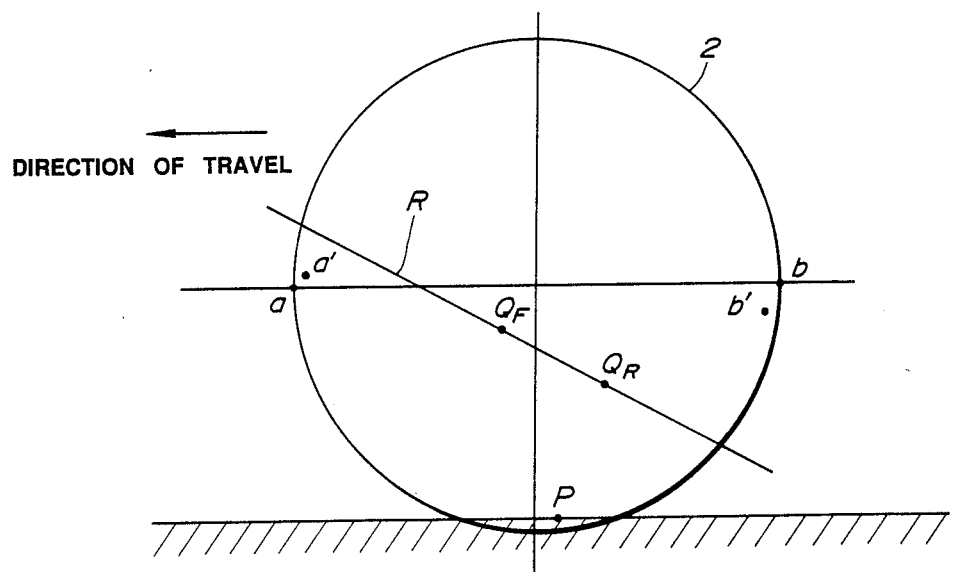
FIG. 9 is an elevational side diagram illustrating the compliance steer.

Since, according to the third embodiment, the outboard end 6 of the front lateral link 14 is disposed at a level higher than the outboard end 8 of the rear lateral link 16, the axis R which has been explained in connection with FIGS. 3 and 4 is now angled not only inboard of the vehicle but also upward of the vehicle as shown in FIGS. 8 and 9. Even if the axis R is angled upward of the vehicle, this embodiment provides substantially the same compliance steer as the first embodiment.

With this arrangement of the third embodiment, an upward angle of a radius rod 22 can be increased more as compared to the arrangement of the first embodiment. Thus, a more improved anti-lift performance is provided.

Referring to FIGS. 10 to 13, the fourth embodiment according to the present invention is described. In this embodiment, the present invention is embodied in an automotive vehicle of the front engine front drive type incorporating four wheel drive.

Figure 10:
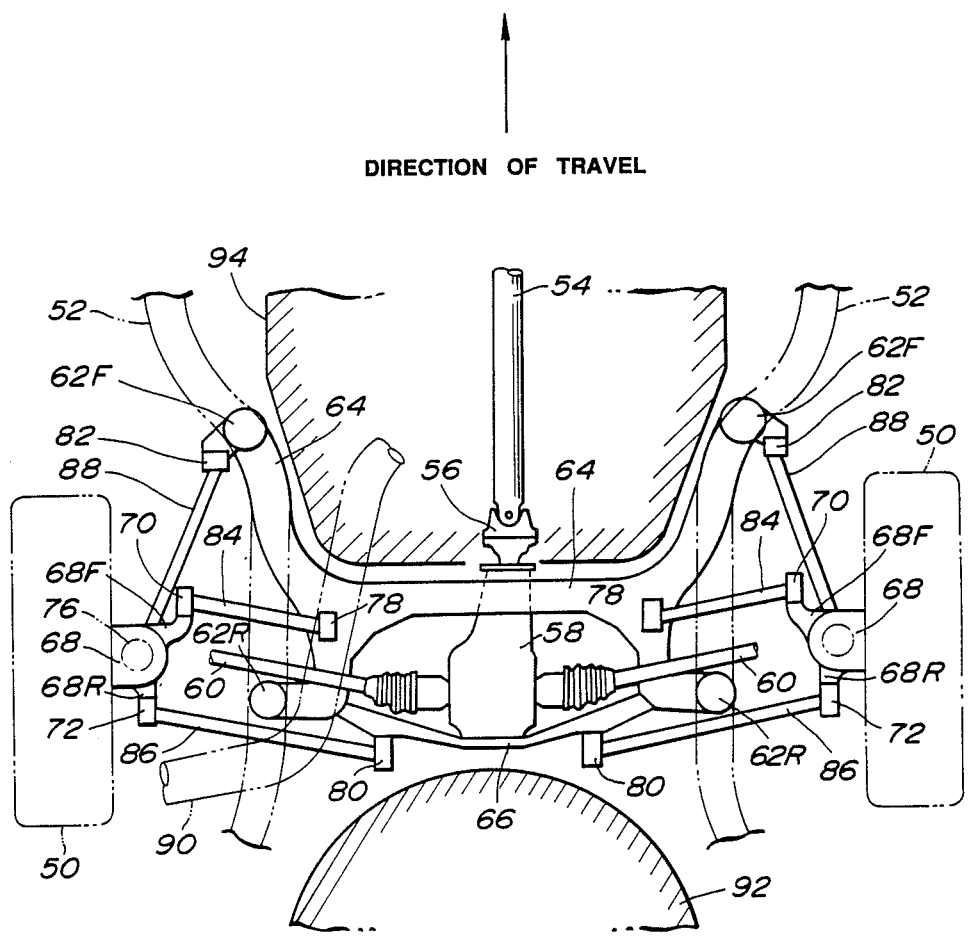
FIG. 10 is a rear end construction of a vehicle incorporating a fourth embodiment of a rear suspension system according to the present invention.
Figure 11:
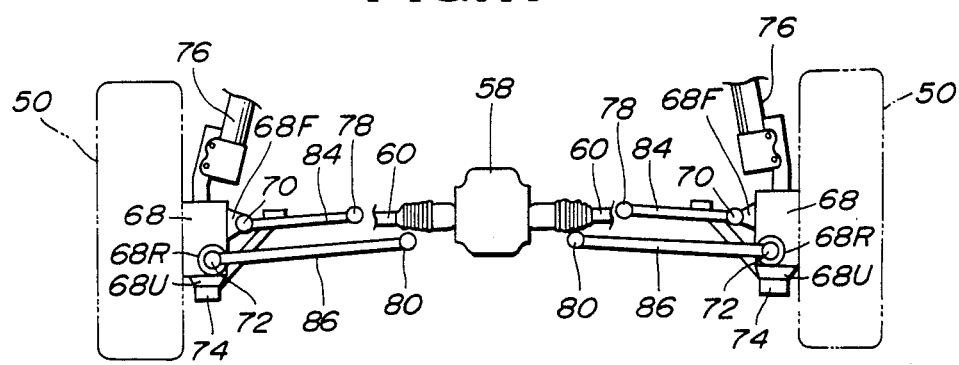
FIG. 11 is a schematic fragmentary end view showing a portion of the fourth embodiment as viewed from the rear of the vehicle.

Referring to FIGS. 10 and 11, reference numerals 50, 50 designate a pair of rear wheels shown in phantom, reference numerals 52 designate side members shown in phantom. The side members 52 which form a part of the vehicle body extend generally in parallel to the longitudinal axis of the vehicle. Designated by a reference numeral 94 is a fuel tank, and designated by a reference numeral 92 is a spare tire pan for receiving a spare tire. A propeller shaft 54 extends from a center differential gear, not shown, toward a rear differential gear 58. The propeller shaft 54 is drivingly connected via a joint 56 to the rear differential gear 58. Two axle shafts 60 extend from the rear differential gear 58 toward the rear wheels 50.

Figure 12:
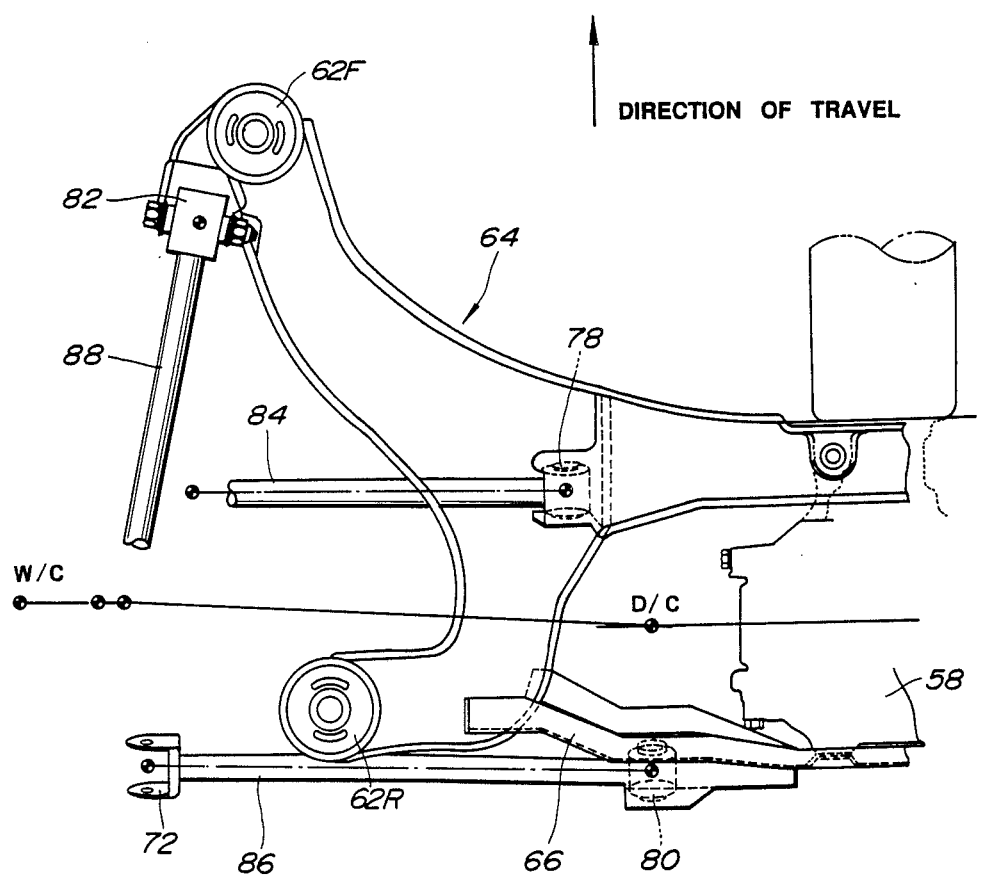
FIG. 12 is an enlarged fragmentary plan view of the fourth embodiment.

As viewed in FIG. 10, a generally H-shaped suspension member 64 is supported by the side members 52, 52 of the vehicle body. The suspension member 64 has a pair of transversely spaced front mount portions 62F, 62F, each being mounted via an insulator on the lower side of the side members 52, 52, respectively. The suspension member 64 also has a pair of transversely spaced rear mount portions 62R, 62R, each being mounted via an insulator on the lower side of the side members 52, 52, respectively. A cross frame 66 bridges rear end portions of the suspension member 64 as shown in FIG. 10. As best seen in FIG. 12, the rear differential gear 58 has its front end portion mounted on a cross portion of the suspension member 64 and its rear end portion mounted on the cross frame 66.

Referring again to FIGS. 10 and 11, the rear wheels 50, 50 are rotatably carried by axle carriers 68, 68. Each axle carrier 68 is connected to the vehicle body side member 52 via a front lateral link 84, a rear lateral link 86 and a radius rod 88. A strut 76 extends vertically from the axle carrier 68 to the vehicle body to absorb a force transmitted vertically to the vehicle body from the wheel 50.

Figure 6:
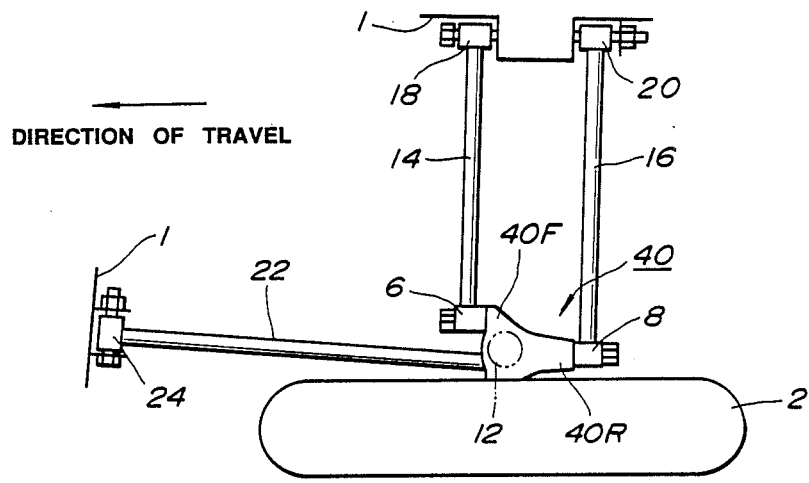
FIG. 6 is a schematic plan view of a third embodiment of a rear suspension system according to the present invention as applied to a rear left wheel of a vehicle.

Describing further with regard to the rear suspension system for the rear left wheel 50, the axle carrier 68 is substantially the same in construction as the axle carrier 40 of the third embodiment shown in FIGS. 6 and 7 and has a front pivot portion 68F, a rear pivot portion 68R and a third pivot portion 68R. The arrangement of the pivot portions 68F, 68R, and 68R are substantially the same as the arrangement of the pivot portions 40F, 40R and 40U shown in FIGS. 6 and 7.

As shown in FIG. 10, the front lateral link 84 has an outboard end 70 pivotably mounted via an elastic bush on the axle carrier 68 at the front pivot portion 68F thereof, while the rear lateral link 86 has an outboard end 72 pivotably mounted via an elastic bush on the axle carrier 68 at the rear pivot portion 68R. Pivot axes of the outboard ends 70 and 72 of the front and rear lateral links 84 and 86 lie substantially parallel to the longitudinal axis of the vehicle. The front lateral link 84 extends from the axle carrier 68 in a direction inclined rearward of the vehicle with respect to a transverse direction toward an inboard side of the vehicle, and has an inboard end 78 pivotably mounted via an elastic bush on the suspension member 64. The rear lateral link 86 extends in parallel to the front lateral link 84 and has an inboard end 80 pivotably mounted on the cross frame 66 on the vertical wall thereof spaced forward from the spare tire pan 92 as best seen in FIG. 13.

The radius rod 88 has a rear end 74 pivotably mounted via an elastic bush on the axle carrier 68 at the third pivot portion 68U thereof. The radius rod 88 has a front end 82 pivotably mounted via an elastic bush on the outer side of the suspension member 64 as best seen in FIG. 12. As best seen in FIGS. 10 and 12, each of the front mount portions 62F is disposed forward of the front end 82 of the radius rod 88, and each of the rear mount portions 62R is disposed forward of the rear lateral link 86 and rearward of the axle shaft 84. In other words, the rear mount portion 62R where the suspension member 64 is mounted via an insulator on the side member 52 of the vehicle body is disposed between the axle shaft 84 and the rear lateral link 86.

Figure 13:
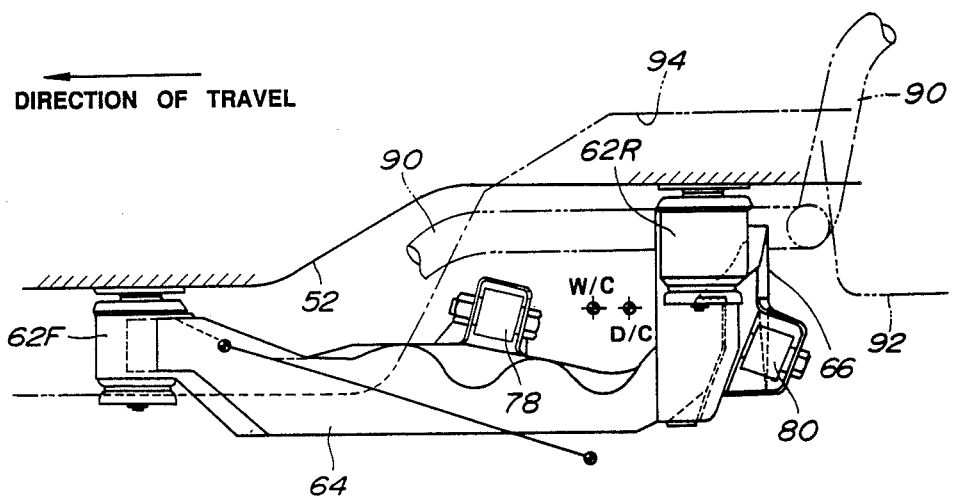
FIG. 13 is a side elevational view showing a suspension member mounted via an insulator on the vehicle body with mounting bushes via which inboard ends of two lateral links are pivotably mounted.

With reard to the arrangement of the rear differential gear 58, the rear differential center D/C of the rear differential gear 58 is displaced rearward of the wheel center W/C of the rear wheel 50 as shown in FIGS. 12 and 13.

As shown in FIGS. 10 and 13, a fuel filler hose 90 extending from an inlet provided on the left side of the vehicle body passes through a space formed between the insulator on the rear mount portion 62R on the suspension member and the spare tire pan 92. This fuel filler tube 90 makes a turn in this space and extends over the rear lateral link 86, axle shaft 60 and front lateral link 84 toward the fuel tank 94 disposed forward of the rear differential gear 58.

According to this embodiment, since the front and rear lateral links 84 and 86 have their inboard ends 78 and 80 displaced rearward as compared to the corresponding outboard ends 70 and 72, a toe angle of the outer rear wheel 50 is varied toward a toe-in side and a toe angle of the inner rear wheel is varied toward a toe-out side more smoothly as compared to the previously described embodiments when the vehicle makes a turn. The cornering stability of the vehicle therefore is greatly improved.

According to this embodiment, the mounting portion of the rear differential gear 58, the inboard ends 78 and 80 of the lateral links 84 and 86 have been displaced rearward of the vehicle in order to provide a sufficiently large capacity of the fuel tank 94 while securing good seating comfort on a rear seat. The rear lateral links 86 and 86 are arranged at a relatively low height from the road surface so that a reduction in the trunk capacity can be avoided even if the lateral links 86 and 86 are displaced rearward of the vehicle.

Since, according to this embodiment, the radius rods 88, front and rear lateral links 84 and 86 are connected via the suspension member 64 to the vehicle body, a transmission of road noise directly to the vehicle body is prevented. Owing to the arrangement wherein the front mounting portions 62F, 62F are disposed forward of the front ends 82 of the radius rods 88, it is now possible to arrange all of the insulators on the mounting portions 62F, and 62R with a sufficiently long span between the front and rear mounting portions 62F and 62R. This causes a considerable reduction in transmission of vibration to the vehicle body. Thus, the stability and ride comfort are improved.

As previously mentioned, the fuel filler hose 90 is now allowed to extend in a direction generally along the side member 52 passing over and across the rear lateral link 86 so that the fuel filler hose 90 can be arranged remote from the spare tire pan 92. Thus, there is provided sufficiently wide clearance between the fuel filler hose 90 and the spare tire pan 92. As will be readily understood from FIG. 10, the space where the fuel filler hose 90 extends through is guarded by the cross frame 66 of the suspension member 64. No particular arrangement is needed to guard the fuel filler hose 90 by securing the clearance against forward movement of the spare tire pan 92 during rearend collision of the vehicle.

What is claimed is:

1. A rear suspension system for a vehicle having a vehicle body with a vehicle longitudinal axis and a road wheel, comprising:
   an axle carrier rotatably carrying the road wheel;
   lateral link means for pivotably connecting said axle carrier with regard to the vehicle body, said lateral link means including outboard ends pivotably mounted on said axle carrier at a front pivot portion and a rear pivot portion, respectively;
   said front pivot portion being disposed inboard of said rear pivot portion with respect to the vehicle; and
   a radius rod having a rear end pivotably mounted on said axle carrier at a third pivot portion and a front end pivotably supported by the vehicle body, wherein said front pivot portion is so disposed inboard of said third pivot portion as to provide an arrangement whereby said lateral link means do not interfere with said radius rod even if said radius rod extends upward with respect to the vehicle from said rear end toward said front end thereof at an increased angle.

2. A rear suspension system as claimed in claim 1, wherein said lateral link means include a front lateral link and a rear lateral link, said front lateral link having an outboard end pivotably mounted via an elastic bush on said axle carrier at said front pivot portion, said rear lateral link having an outboard end mounted via an elastic bush on said axle carrier at said rear pivot portion, said front lateral link having an inboard end pivotably supported by the vehicle body, said rear lateral link having an inboard end pivotably supported by the vehicle body, said front lateral link being shorter than said rear lateral link.

3. A rear suspension system as claimed in claim 1, wherein said lateral link means include a lateral link having a front arm with an outboard end pivotably mounted via an elastic bush on said axle carrier at said front pivot portion and a rear arm with an outboard end pivotably mounted via an elastic bush on said axle carrier at said rear pivot portion, said single lateral link having an inboard end pivotably supported by the vehicle body.

4. A rear suspension system as claimed in claim 1, wherein said axle carrier includes said front and rear pivot portions, and a wheel center axis which the road wheel turns about.

5. A rear suspension system as claimed in claim 4, wherein said front and rear pivot portions are disposed on the opposite sides of the wheel center axis.

6. A rear suspension system as claimed in claim 4, wherein said front pivot portion is a shorter distance from the wheel center axis than said rear pivot portion 7. A rear suspension system as claimed in claim 1, wherein said front pivot is disposed at a level displaced upward with respect to the vehicle from said rear pivot portion so as to provide an arrangement whereby said front pivot portion and said front lateral link do not interfere with said radius.

8. A rear suspension system as claimed in claim 1, wherein said front pivot is disposed at a level displaced upward with respect to the vehicle from said rear pivot portion so as to provide an arrangement whereby said front pivot portion and said lateral link means do not interfere with said radius rod.

9. A rear suspension system as claimed in claim 2, further comprising a suspension member supported via elastic means by the vehicle body, wherein said front end of said radius rod is pivotably mounted via a resilient bush on said suspension member at a first predetermined portion thereof, said inboard end of said front lateral link is pivotably mounted via an elastic bush on said suspension member at a second predetermined portion thereof, and said inboard end of said rear lateral link is pivotably mounted via an elastic bush on said suspension member at a third predetermined portion thereof.

10. A rear suspension system as claimed in claim 9, wherein said suspension member has a front mount portion mounted via an elastic insulator on the vehicle body and a rear mount portion mounted via an elastic insulator on the vehicle body.

11. A rear suspension system as claimed in claim 10, wherein said front mount portion of said suspension member is disposed forward, with respect to the vehicle longitudinal axis, of said first predetermined portion where said front end of said radius rod is pivotably mounted on, and said rear mount portion of said suspension member is disposed forward, with respect to the vehicle longitudinal axis, of said rear lateral link.

12. A rear suspension system as claimed in claim 11, wherein said rear mount portion of said suspension member is disposed rearward, with respect to the vehicle longitudinal axis, of the axle shaft of said axle carrier so as to provide an arrangement which allows a fuel filler hose to pass over said rear lateral link, the axle shaft, and the front lateral link toward a fuel tank.

* * * * *